(12) United States Patent
Potter

(10) Patent No.: US 6,499,481 B1
(45) Date of Patent: Dec. 31, 2002

(54) PROTECTIVE DEVICE

(76) Inventor: Craig S. Potter, 557 Broadway, Apt. 13 C., Port Ewen, NY (US) 12466

( * ) Notice: Subject to any disclaimer, the term of this patent is extended or adjusted under 35 U.S.C. 154(b) by 0 days.

(21) Appl. No.: 10/174,705

(22) Filed: Jun. 19, 2002

(51) Int. Cl.⁷ .............................................. F24C 15/36
(52) U.S. Cl. ...................................... 126/201; 126/9 B
(58) Field of Search .................... 126/201, 9 R, 126/42, 58, 214 R, 214 D, 9 B, 544; 160/DIG. 9, 121, 135

(56) References Cited

U.S. PATENT DOCUMENTS

| | | | |
|---|---|---|---|
| 806,160 A | 12/1905 | Metz | |
| 849,319 A | * 4/1907 | Blanchard | 126/201 |
| 907,010 A | * 12/1908 | Davidson | 126/201 |
| 1,316,976 A | * 9/1919 | Reeve | 126/201 |
| 1,440,336 A | 12/1922 | Buffington | |
| 3,276,440 A | 10/1966 | Sazegar | 126/25 |
| 4,870,948 A | 10/1989 | Wallace | 126/224 |
| 5,165,384 A | 11/1992 | Knutson | 126/25 |
| 5,590,640 A | * 1/1997 | Kollias et al. | 126/201 |
| 6,026,802 A | * 2/2000 | Patterson | 126/201 |

* cited by examiner

Primary Examiner—James C. Yeung

(57) ABSTRACT

An enclosure for use with an outdoor grill having plates at its base used to secure the enclosure to a base surface. Preferably the enclosure is formed from a series of panels which adjoin one another and are secured to one another.

17 Claims, 3 Drawing Sheets

PROTECTIVE DEVICE

BACKGROUND OF THE INVENTION

1. Field of the Invention

This invention relates to protective devices and more particularly pertains to a protective device that encloses an outdoor cooking grill.

2. Prior Art and Objects

Various devices have been developed to enclose dangerous equipment such as heating stoves and cooking grills. In the past, when stoves were a primary source of home heat, enclosures were used to protect children as well as adults from being injured by coming into contact with a hot stove. The Metz patent, U.S. Pat. No. 806,160 describes an enclosure for placement about a heating stove. The patent further describes the enclosure as being capable of being knocked down into pieces for storage during warm periods of the year when the stove is not in use. The device taught by the Metz patent also has feet which are secured to the floor.

Another form of stove enclosure is taught in the Buffington patent, U.S. Pat. No. 1,440,336. The Buffington patent utilized a heavy base to retain the enclosure in place.

The Knutson patent, U.S. Pat. No. 5,165,384 teaches an enclosure for use with an outdoor grill. Specifically, Knutson teaches a device for mounting on a balcony but includes features for protection of children from a hot grill.

It is apparent that outdoor grills when in operation, are dangerously hot and therefore are a threat to small children and can also be dangerous to adults should they stumble and fall into the grill. Since outdoor grills are often moved about and used at various outings and campsites, an enclosure that is easily assembled and disassembled and that can be readily packed is most desirable.

Accordingly, it is an object of the present invention to provide an enclosure for an outdoor grill that assures against contact with a hot outdoor grill.

It is a further object of the present invention to provide an enclosure for a grill that can be readily broken down into a few parts for travel and storage and can likewise be easily assembled.

It is still a further object of the present invention to provide an enclosure for an outdoor grill that is economical and durable.

These objects together with other objects of the invention, along with the various features of novelty which characterize the invention, are pointed out with particularity in the claims annexed to and forming part of this disclosure. For a better understanding of the invention, its operating advantages and the specific objects attained by its uses, reference should be had to the accompanying drawings and descriptive matter in which there is illustrated preferred embodiments of this invention.

SUMMARY OF THE INVENTION

A protective device is provided for use with an outdoor grill. The protective device is situated on a base area. An enclosure having an inside area within it and an outside area outside it is formed from a plurality of panels that are substantially identical and that adjoin one another. Each panel has a top edge and a bottom edge and each panel further has a main section and a offset section. The offset section is substantially smaller than the main section and is slightly offset from the main section. The main section has a main edge and the offset section has an offset edge. The offset section of one panel overlaps the main section of another adjoining panel. Means are provided for securing each offset section to the main section of the adjoining panel. A plurality of plates are secured to the base edge of each panel substantially at right angles to the panel. Each plate has an opening through it. Means are also provided for insertion into the openings in the plates to secure the panels to the base area.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3A is a cross section view of the top edge of the enclosure.

DETAILED DESCRIPTION OF THE NUMERALS

| NUMERAL | DESCRIPTION |
|---|---|
| 11 | Enclosure |
| 13 | Panel |
| 15 | Outdoor Grill |
| 17 | Top Edge |
| 19 | Base Edge |
| 21 | Main Section |
| 22 | Main Edge |
| 23 | Offset Section |
| 24 | Offset Edge |
| 25 | Inside Area |
| 26 | Outside Area |
| 27 | Bolt |
| 29 | Bolt Head |
| 31 | Wing Nut |
| 33 | Hole |
| 35 | Plates |
| 37 | Opening |
| 39 | Base Area |
| 41 | Stakes |

DESCRIPTION OF THE PREFERRED EMBODIMENT

Figure 1:
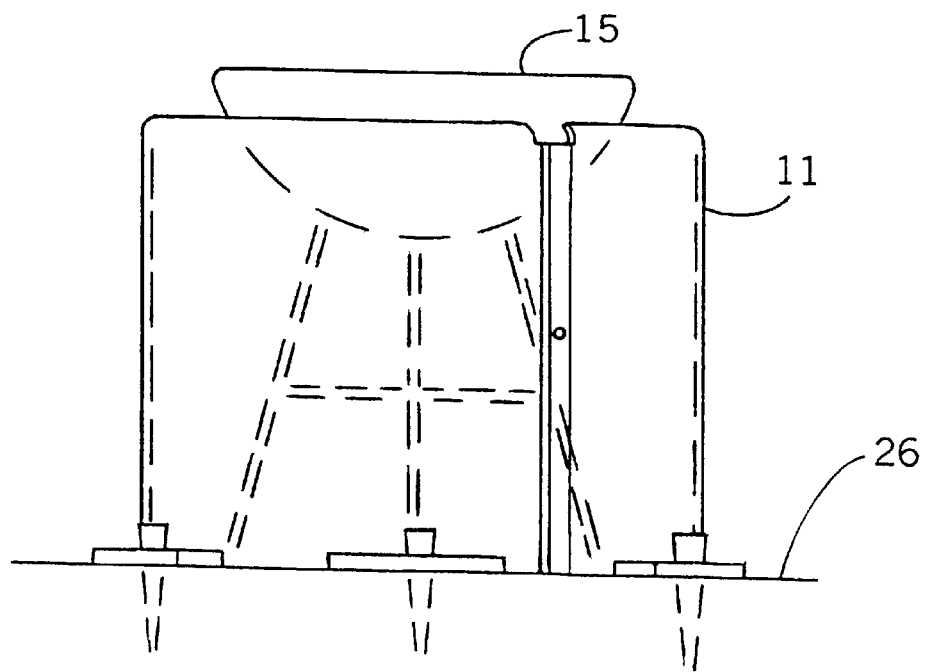
FIG. 1 is a side elevation of an enclosure located about an outdoor grill with the portion of the grill within the enclosure shown in broken lines.
Figure 3:
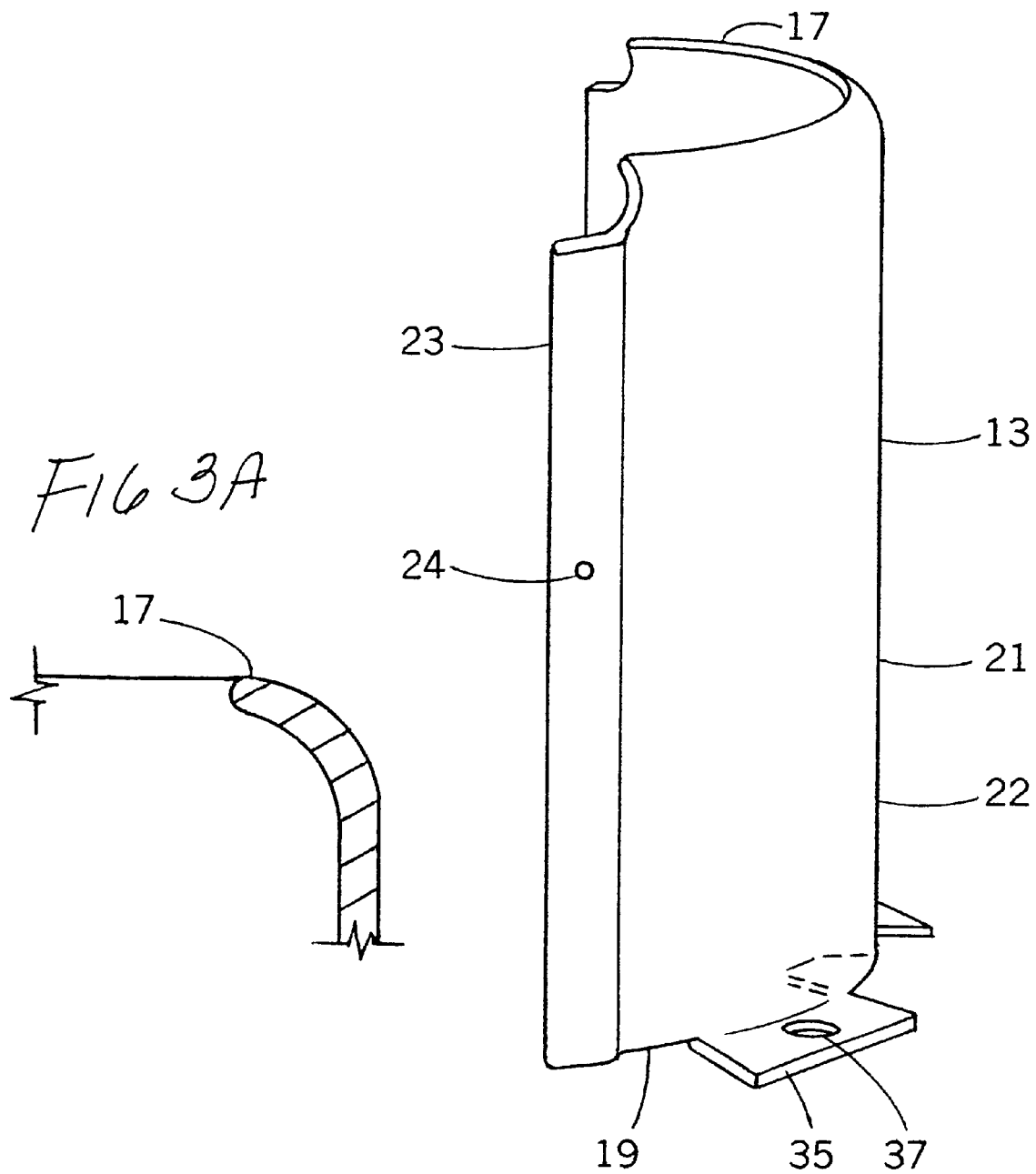
FIG. 3 is a perspective view of one panel used in the enclosure.

With reference now to the drawings, and in particular to FIG. 1 and FIG. 3, the enclosure 11 and one panel 13 used to form the enclosure 11 are shown. Obviously, if the enclosure is made in one piece, the protective benefits would still be achieved but the enclosure 11 would be difficult if not impossible to store and transport. By sectionalizing the enclosure 11 into equal arcuate panels 13, the panels 13 may be placed one on top of the other for ease of packing and shipment.

Figure 2:
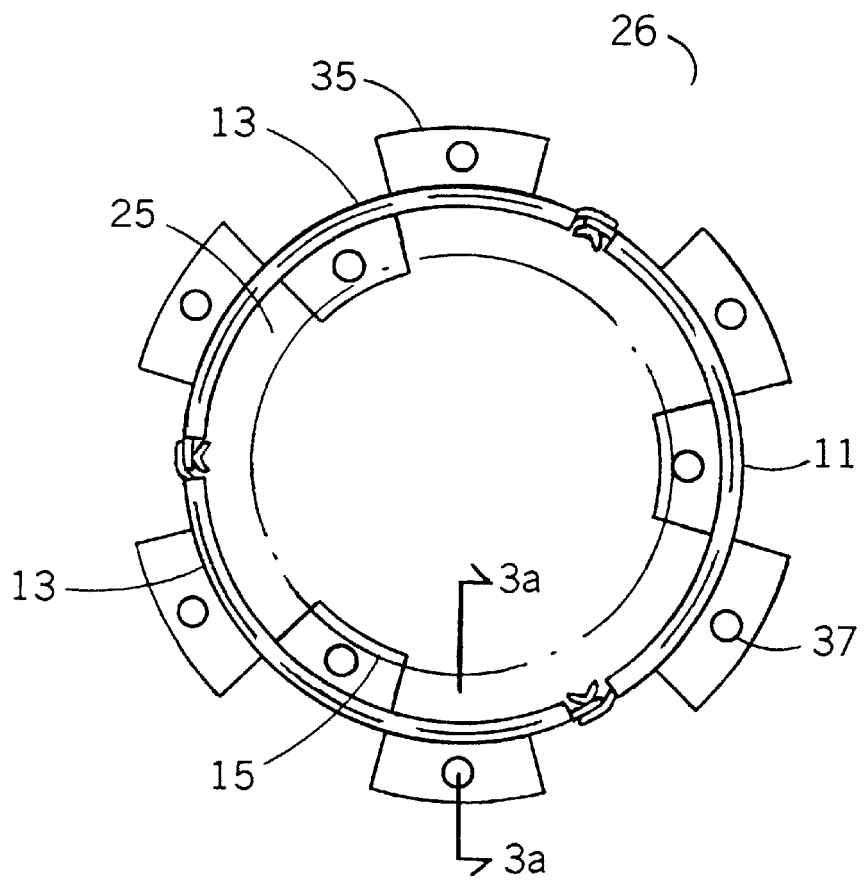
FIG. 2 is a top plan view of the enclosure showing the panels and the plates at the base edge of the panels.

In FIG. 2 and FIG. 3, the enclosure 11 and panel 13 shown are based upon an enclosure formed from three equal panels 13. The least number of panels 13 that could be considered would be two panels 13 and most likely no more than four panels 13 would be used considering the average size of an outdoor grill 15. Possibly, an enclosure 11 intended for very large grills could have five of six panels but, for the usual commercially available grills intended for family use and of a size that permits transporting them to various sites, whether fired by gas or solid fuel, four panels 13 would appear to be maximum. Clearly, ease of handling and storage of the enclosure 11 has to be weighed against ease of assembly.

An other factor in the sizing of the grill 15 is the ease by which the grill 15 can be used with the enclosure 11 in place. It is intended that the enclosure 11 will be sized to permit use of the grill 15 from outside the enclosure 11 thus eliminating any need for a door which might be inadvertently left open thereby permitting a child to enter the enclosure and be injured.

Figure 4:
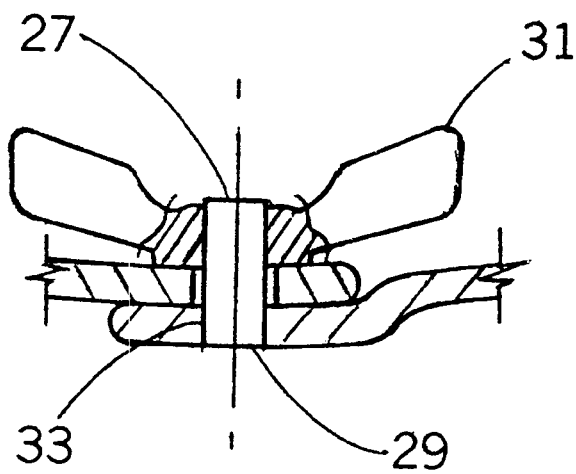
FIG. 4 is a detailed cross-sectional view of the overlap adjoining panels and the means for securing one panel to the adjoining panel.

Referring now specifically to FIG. 3, a panel that is one of three equal panels 13 has a top edge 17 and a base edge 19. The panel 13 has a main section 21 which for a panel 13, that is one of three panels 13, represents one hundred and twenty degrees. The main section 21 has a main edge 22. Extending from the main section 21 but just slightly offset from it is an offset section 23. The offset section 23 has an offset edge 24 remote from the main section 23. The offset section 23 is short by comparison to the main section 21 and needs to be only a two or three inch extension to the main section 21. The offset section 23 may be offset toward the inside area 25 of the enclosure 11 but preferably is toward the outside area 26 outside of the enclosure 11. Having the offset section 23 offset toward the outside area 26 provides the best appearance. The offset section 23 overlaps the main section 21 of the adjoining panel 13. At the offset section 23, as best seen is FIG. 3 and FIG. 4 one technique for securing the panels 13 together is shown. A bolt 27 is shown secured at the head 29 of the bolt 27 in the offset section 23 generally midway between the top edge 17 and the base edge 19. A wing nut 31 is threaded onto the bolt 27 after the bolt 27 is inserted into hole 33 in the main section of the adjacent panel 13. The hole 33 is located adjacent to the main edge 22 of each panel 13 at substantially the same position between the top edge 17 and the base edge 19.

Although one bolt 27 with one wing nut 27 at each offset section is shown, more bolts could be used. Other fastening means could replace the bolt 27 and the wing nut 31. Such fastening means is not a critical part of this invention. The number of bolts 27 and wing nuts 31 may also vary and the thickness of the material used to form the panels 13 will also have a bearing on the number of fastening means used to hold the panels 13 together. The greater the material thickness, the more rigid each panel 13 will be but since a light weight enclosure 11 is desired, a thin material for the panels 13 is most desirable. The panels would best be made of aluminum or this steel and even heat resistant plastic could be used for th enclosure 11. A bright color is preferable for the enclosure 11 and warning labels on the panels 13 toward the outside area 26 would be most desirable.

As seen in FIG. 1 and FIG. 3, the top edge 17 of the enclosure 11 is bent inwardly toward the inside area 25 of the enclosure 11. This bend in the top edge 17 serves to strengthen the enclosure 11 and most importantly to prevent injury from someone falling against the top edge 17 of the enclosure 11. At the offset section 23, the top edge 17 is lowered to just below the bend in the top edge 17 to avoid having a bend at the offset section 23.

At the base edge, 19, plates 35 are affixed substantially at right angles to the enclosure 11. The plates 35 are preferably located toward both the inside area 25 and the outside area 26. The plates 35 alternate from the inside area 25 an the outside area 26 along virtually the entire base edge 19 of each panel 13.

Figure 5:
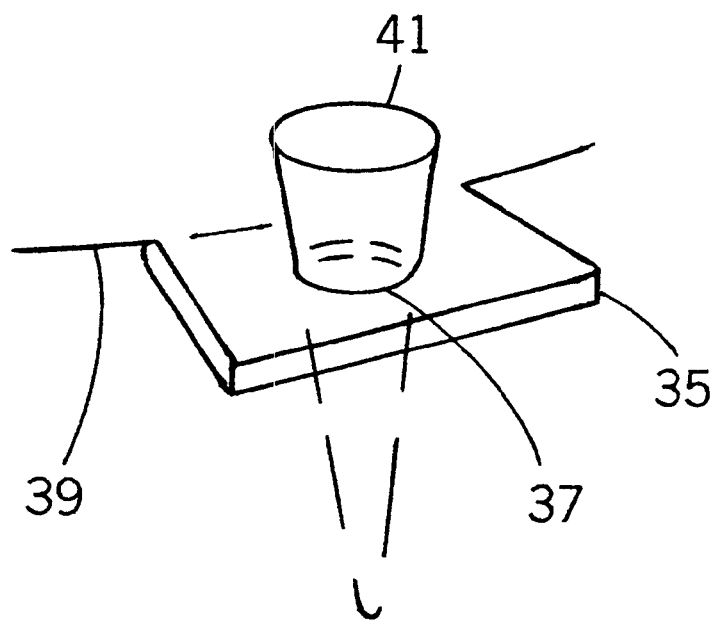
FIG. 5 is a pictorial view of the lower part of a panel showing a plate with a stake driven into the ground.

An opening 37 is provided in each plate 35. The enclosure 11, which is intended primarily but not exclusively for use on a base area 39 which is earthen. As best seen in FIG. 5, the plates 35 can be secured to the base area 39 by stakes 41 such as are used for securing a camping tent. The stakes 41 are driven into the base area 39 through the opening 37 in the plates 35. Each stake 41 can be readily removed but once installed, the plurality of stakes 41, securely hold the enclosure 11 in place preventing it from being moved inadvertently.

The enclosure 11 may also be used with other base areas 39 but then, other fastening means would be required. The stakes 41 for the plates 35 on the inside area 25 of the last panel13 to installed might pose some problems but can usually be installed from the outside area 26 of the enclosure 11. In any event, it is not necessary to place a stake 41 in every opening 37 but as many as possible is certainly to be recommended.

It is to be understood that the drawings and description matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A protective device for use with an outdoor grill situated on a base area, such protective device comprising:
   an enclosure having an inside area within it and an outside area outside it and being formed from a plurality of panels that are substantially identical and that adjoin one another, each panel having a top edge and a bottom edge and each panel further having a main section and an offset section, the offset section being substantially smaller than the main section and being slightly offset from the main section, the main section having a main edge and the offset section having an offset edge, the offset section of one panel overlapping the main section of another adjoining panel;
   means for securing each offset section to the main section of the adjoining panel;
   a plurality of plates secured to the base edge of each panel substantially at right angles to the panel, each plate having an opening through it; and
   means for insertion into the openings in the plates to secure the panels to the base area.

2. A protective device according to claim 1 wherein the enclosure is circular.

3. A protective device according to claim 1 wherein the enclosure is circular and the plurality of panels is three panels.

4. A protective device according to claim 1 wherein the enclosure is circular and the plurality of panels is four panels.

5. A protective device according to claim 1 wherein the enclosure is circular and the plurality of panels is five panels.

6. A protective device according to claim 1 wherein the enclosure is circular and the plurality of panels is six panels.

7. A protective device according to claim 1 wherein the plates are located both in the inside area and in the outside area.

8. A protective device according to claim 1 wherein the means for insertion into the openings in the plates are stakes.

9. A protective device for use with an outdoor grill situated on a base area, such protective device comprising:

a circular enclosure having an inside area within it and an outside area outside it and being formed from a plurality of at least three panels that are substantially identical and that adjoin one another, each panel having a top edge and a bottom edge and each panel further having a main section and an offset section, the offset section being substantially smaller than the main section and being slightly offset from the main section, the main section having a main edge and the offset section having an offset edge, the top edge of the main section of each panel being turned toward the inside area, the offset section of one panel overlapping the main section of another adjoining panel;

means for securing each offset section to the main section of the adjoining panel;

a plurality of plates secured to the base edge of each panel substantially at right angles to the panel, each plate having an opening through it; and means for insertion into the openings in the plates to secure the panels to the base area.

10. A protective device according to claim 9 wherein the plurality of panels is three panels.

11. A protective device according to claim 9 wherein the plurality of panels is four panels.

12. A protective device according to claim 9 wherein the plurality of panels is five panels.

13. A protective device according to claim 9 wherein the plurality of panels is six panels.

14. A protective device according to claim 9 wherein the plates are located both in the inside area and in the outside area.

15. A protective device according to claim 9 wherein the means for insertion into the openings in the plates are stakes.

16. A protective device for use with an outdoor grill situated on a base area, such protective device comprising:

a circular enclosure having an inside area within it and an outside area outside it and being formed from a plurality of at least three panels that are substantially identical and that adjoin one another, each panel having a top edge and a bottom edge and each panel further having a main section and an offset section, the offset section being substantially smaller than the main section and being slightly offset from the main section, the main section having a main edge and the offset section having an offset edge, the top edge of the main section of each panel being turned toward the inside area, the offset section of one panel overlapping the main section of another adjoining panel;

means for securing each offset section to the main section of the adjoining panel;

a plurality of plates secured to the base edge of each panel substantially at right angles to the panel both in the inside area and the outside area, each plate having an opening through it; and means for insertion into the openings in the plates to secure the panels to the base area.

17. A protective device according to claim 16 wherein the means for insertion into the openings in the plates are stakes.

* * * * *